US005484160A

United States Patent [19]
Ek

[11] Patent Number: 5,484,160
[45] Date of Patent: Jan. 16, 1996

[54] GARDEN CART

[76] Inventor: J. Edwin Ek, 5161 S. Marion, Tulsa, Okla. 74135

[21] Appl. No.: 194,868

[22] Filed: Feb. 14, 1994

Related U.S. Application Data

[63] Continuation-in-part of Ser. No. 878,883, May 4, 1992, Pat. No. Des. 344,383, and a continuation-in-part of Ser. No. 4,244, Jan. 29, 1993, Pat. No. Des. 347,404.

[51] Int. Cl.⁶ .................................................. B62B 1/12
[52] U.S. Cl. .................. 280/659; 280/47.19; 280/47.18; 280/47.26; 280/47.35; 280/47.33
[58] Field of Search ........................... 280/47.17, 47.18, 280/47.26, 47.19, 47.35, 47.24, 47.31, 47.33, 652, 655.1, 659, 33.992; 108/90; 242/388.6, 395, 403.1, 530.3; 312/231, 140.2, 249.8

[56] References Cited

U.S. PATENT DOCUMENTS

| | | | |
|---|---|---|---|
| D. 338,306 | 8/1993 | White et al. | 280/47.18 |
| 339,256 | 4/1886 | Benedict | 242/403.1 |
| 2,237,539 | 8/1940 | Hinnells | 280/659 |
| 2,705,114 | 3/1955 | Worsham | 280/47.24 |
| 2,757,012 | 4/1953 | Leffler | 280/47.26 |
| 2,905,480 | 9/1959 | Giovannelli | 280/47.19 |
| 3,014,732 | 12/1961 | Schemenauer | 280/646 |
| 3,897,080 | 7/1975 | Isom | 280/47.19 |
| 3,912,291 | 10/1975 | Frisch | 280/33.992 |
| 4,172,567 | 5/1978 | Post | 242/388.6 |
| 4,350,366 | 9/1982 | Helms | 280/47.26 |
| 4,733,703 | 3/1988 | Cimino | 144/285 |
| 4,786,122 | 11/1988 | Nichoalds | 312/249.8 |
| 4,998,743 | 11/1989 | Thielen | 280/47.26 |
| 5,213,351 | 5/1993 | Chen | 280/47.26 |
| 5,265,893 | 11/1993 | Ettlin | 108/90 |
| 5,318,315 | 6/1994 | White et al. | 280/47.18 |

FOREIGN PATENT DOCUMENTS

| | | | |
|---|---|---|---|
| 1749098 | 7/1992 | U.S.S.R. | 280/47.24 |

*Primary Examiner*—Margaret A. Focarino
*Assistant Examiner*—Min S. Yu
*Attorney, Agent, or Firm*—Frank J. Catalano; Scott R. Zingerman

[57] ABSTRACT

A cart for storing and transporting gardening tools and materials includes a shell, a wheel assembly journalled to the shell for transporting the shell and a steering assembly fixed to a rear portion of the shell for guiding the shell during transport. The shell has a rectangular bottom and front and side walls formed from arrays of tubular pots, each for receiving a tool through an open upper end thereof. The wheel assembly includes an axle extending transversely across the shell at approximately its midpoint and through the side walls. The wheels are large in relation to the shell and are disposed in wells defined by the bottoms of the tool pots contoured substantially to an hemispherical arc concentric with the wheels. At least one of the rearmost pots of each shell side wall extends below the shell bottom as legs which, together with the wheels, supporting said shell in a substantially level condition. The steering assembly includes arms extending rearwardly from the side walls, a rod extending between rearmost portions of the arms and at least one pair of reels independently mounted between the arms on a common shaft. A vertical stack of compartments spaced by shelves therebetween and an open compartment extend the full depth of the shell. Each stacked compartment may contain a drawer horizontally slidable into and vertically liftable out of the open compartment. Permanent work surfaces may also be provided over the stacked compartment and the steering assembly.

18 Claims, 5 Drawing Sheets

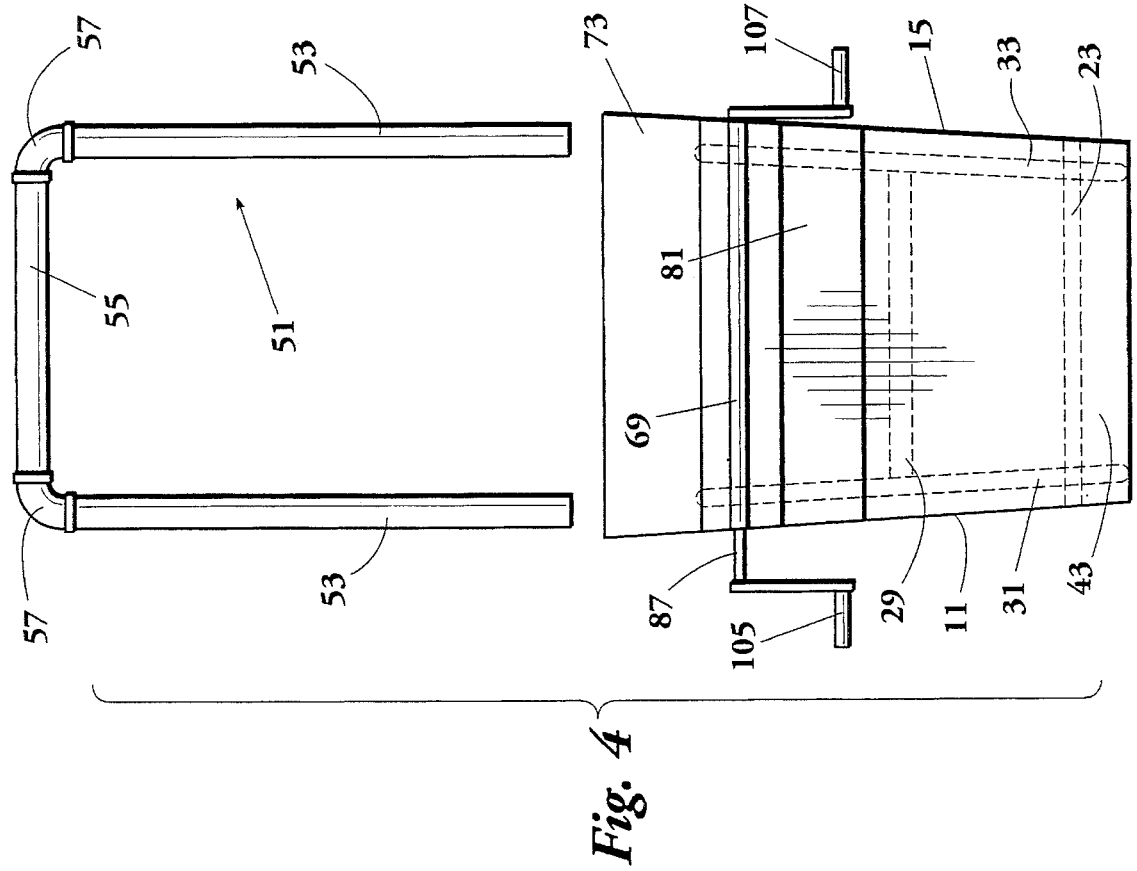
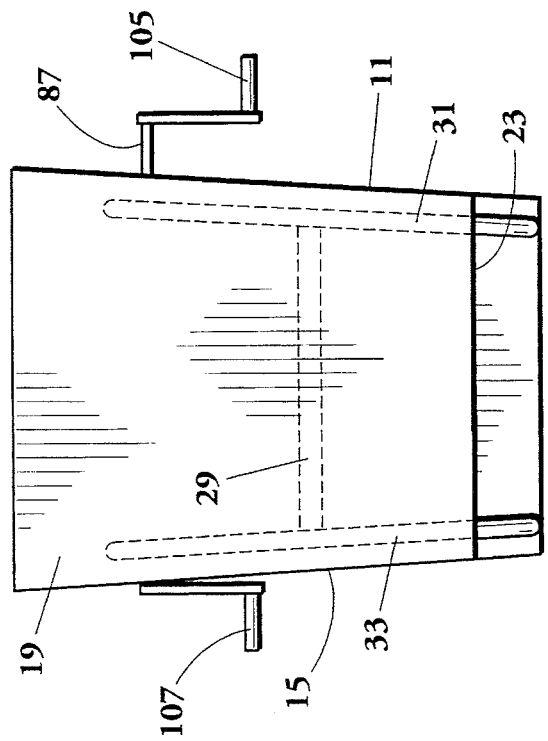

GARDEN CART

CROSS REFERENCE TO RELATED APPLICATIONS

This application is a continuation-in-part of application Ser. No. 07/878,883, filed May 4, 1992, D344,383, entitled "GARDEN CADDY", inventor J. Edwin Ek; and application Ser. No. 29/004,244, filed Jan. 29, 1993, D347,404 entitled "FLOWER GARDEN CART", inventor J. Edwin Ek.

BACKGROUND OF THE INVENTION

This invention relates generally to gardening equipment and more particularly concerns carts for storing, transporting and facilitating use of gardening tools and materials.

A wide variety of gardening tools and materials are necessary to the efficient performance of diverse gardening activities. It is a common occurrence for the typical homeowner-gardener, already pressed by social and business demands, not to have the proper tools or materials immediately at hand to accomplish a desired gardening task. The more dedicated gardener nevertheless persists, making the time consuming repetitive trips between the storage shed or garage and the garden. Less dedicated gardeners may either perform the task with those inadequate tools and materials immediately at hand, accepting less efficient or less satisfactory results, or may simply put off the task to a future gardening session.

It is, therefore, a primary object of this invention to provide the homeowner-gardener with a cart adapted to the convenient storage, transport and use of a wide variety of gardening tools and materials. Another object of this invention is to provide a gardening cart capable of storing a wide variety of gardening tools and materials in a limited space. It is also an object of this invention to provide a gardening cart which stores gardening tools and materials as to facilitate their ready access to the gardener. A further object of this invention is to provide a gardening cart which is easily manipulable and transportable. It is another object of this invention to provide a gardening cart facilitating the extension of water and electrical power sources from their point of origin on the premises to the garden.

SUMMARY OF THE INVENTION

A cart for storing and transporting gardening tools and materials includes a shell, a wheel assembly journalled to the shell for transporting the shell and a steering assembly fixed to a rear portion of the shell for guiding the shell during transport. The shell has a rectangular bottom and front and side walls formed from pairs of panels spaced by vertical dividers to define arrays of tubular pots, each for receiving a tool through an open upper end thereof. The wheel assembly includes an axle extending transversely across the shell at approximately its midpoint and through the side walls. The wheels, one on each end of the axle and external to the shell, are large in relation to the shell but of diameter less than its length. They are disposed in wells defined by the bottoms of the tool pots contoured substantially to an hemispherical arc concentric with the wheels. At least one of the rearmost pots of each shell side wall extends below the shell bottom as legs which, together with the wheels, supporting said shell in a substantially level condition. The steering assembly includes arms extending rearwardly from the side walls, a rod extending between rearmost portions of the arms and a reel assembly mounted between the arms, the reel assembly having at least one pair of reels independently mounted on a common shaft. In one preferred embodiment, a frame having opposing right triangular sides is fixed to a panel along the hypothenuse edges thereof. The panel has a plurality of prongs depending therefrom positioned for alignment with and insertion into the open upper ends of a plurality of the pots for securing the panel as a work table atop the shell. A pair of ears extend from the right angle corners of the triangles for insertion into the open upper ends of a pair of the pots of the front wall whereby the panel and the front wall cooperate to form a storage compartment forward of the front wall. Furthermore, the triangles may have right angle legs dimensioned to fit in a space defined by the rear edges of the shell side walls and the lower edges of the arms, the ears are tubular and the rearmost pots have slots for receiving the ears in alignment with the pots. A pair of vertical members connected at upper ends thereof to opposite ends of a horizontal member are slidably insertable either into the rearmost pots and through the ears to secure the frame in the space or into opposite pots above the wheels for providing a hanger above the shell. The shell will further preferably have a plurality of vertically stacked compartments defined by at least one shelf therebetween and an open compartment extending a full depth of the shell, the axle being aligned with an interior edge of one of the shelves and at least one of the stacked compartments containing a drawer horizontally slidable into and vertically liftable out of the open compartment. Permanent work surfaces may also be provided over the stacked compartment and the steering assembly.

BRIEF DESCRIPTION OF THE DRAWINGS

Other objects and advantages of the invention will become apparent upon reading the following detailed description and upon reference to the drawings in which:

FIG. 3 is a front elevation view of the cart of FIG. 1;

FIG. 4 is a rear elevation view of the cart of FIG. 1 illustrating the flower pot hanger of the cart withdrawn from its stored condition;

Figure 1:
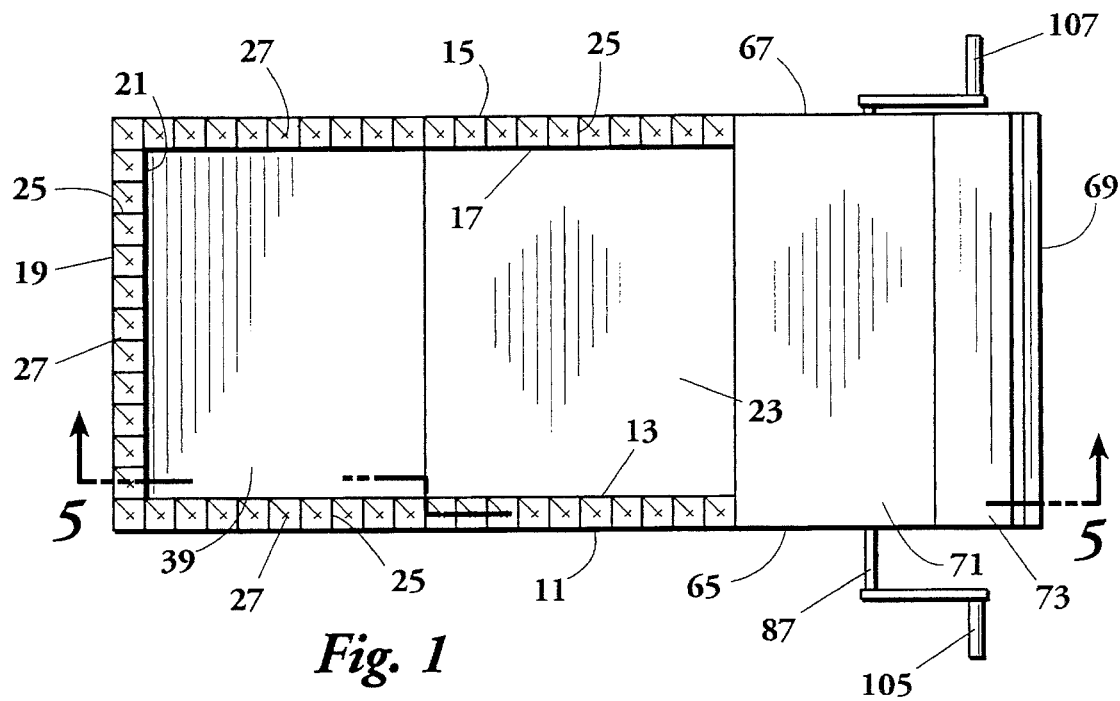
FIG. 1 is a top plan view of a preferred embodiment of the cart.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

The exterior of the garden cart is illustrated in FIGS. 1 through 4 and consists essentially of a shell, a wheel assembly and a steering assembly. The shell consists of sides formed by a left outer wall 11, a left inner wall 13, a right outer wall 15 and a right inner wall 17 and a front formed by a front outer wall 19 and a front inner wall 21. A bottom 23 extends to the inner side walls 13, 17 and 21. The outer walls 11, 15 and 19 are connected to their respective inner walls 13, 17 and 21 by a plurality of dividers 25 arranged in spaced apart vertical planes transverse to the walls they connect. Preferably, the outer walls 11, 15 and 19 will be spaced approximately two inches from the inner walls 13, 17 and 21 and the planes of the dividers 25 will be spaced on approximately two inch centers so as to define a plurality of vertical tubular tool pots 27 of substantially square cross-section along the sides and front of the cart.

Figure 2:
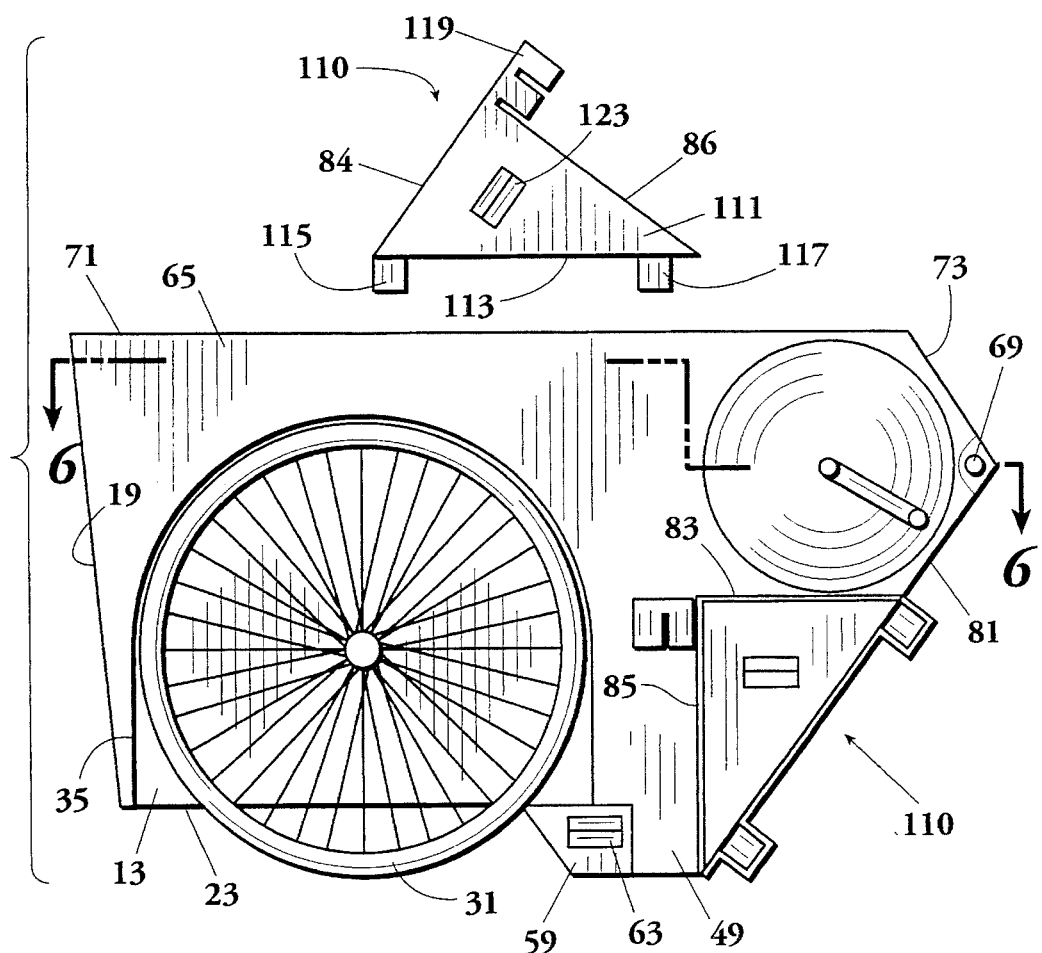
FIG. 2 is a side elevational view of the cart of FIG. 1.

An axle 29 extends transversely across the shell through the inner side walls 13 and 17. Wheels 31 and 33 are mounted on the axle 29 outside of the inner walls 13 and 17 and, as best seen in FIG. 2, each outer side wall 11 and 15 has a cut-out portion 35 hemispherically concentric with its wheel 31 and 33. As can best be seen in FIG. 5, the dividers 25 extend downwardly from the top of the cart to the cut-out 35.

Figure 5:
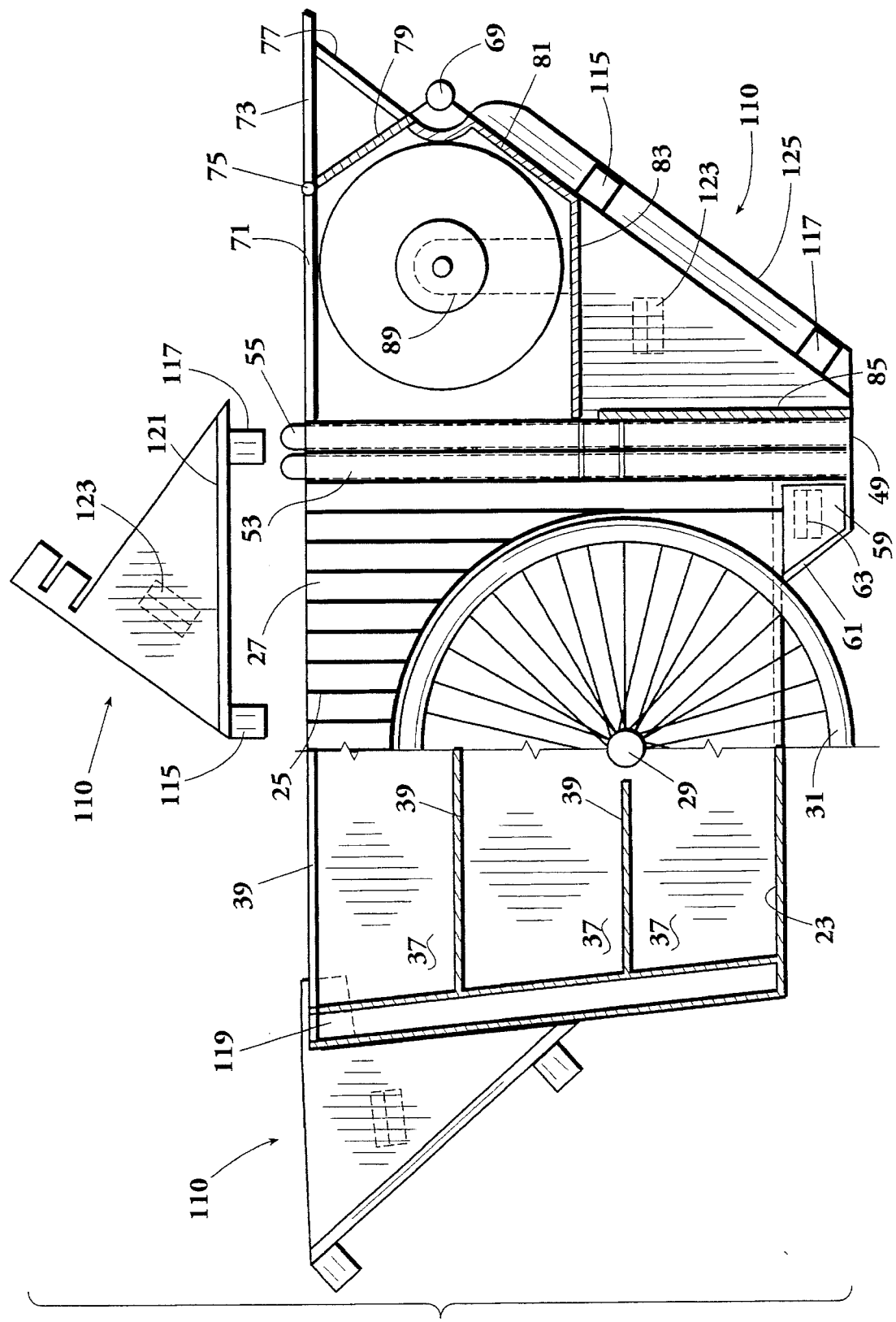
FIG. 5 is a cross-sectional view taken along the line 5—5 of FIG. 1.
Figure 7:
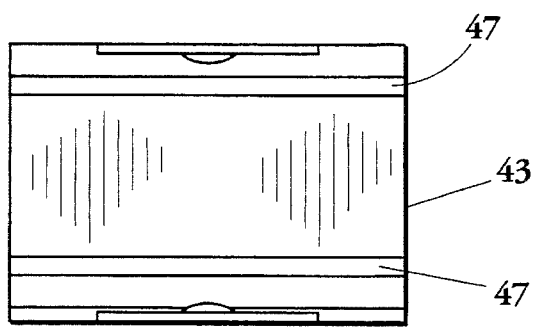
FIG. 7 is a top elevation view of a forward compartment drawer of the cart of FIG. 1.
Figure 8:
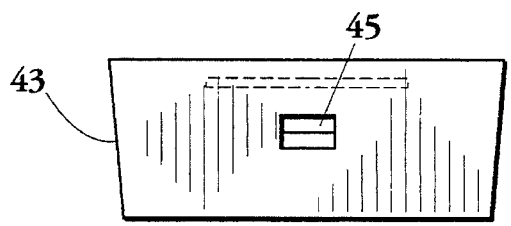
FIG. 8 is a rear elevation view of the drawer of FIG. 7.
Figure 9:
FIG. 9 is a side elevation view of the drawer of FIG. 7.

As can also best be seen in FIG. 5, the main portion of the cart is divided into three vertically aligned forward compartments 37 by shelves 39 which extend from the inner front wall 21 to a vertical plane passing through the wheel axle 29, the wheel axle 29 further being preferably aligned with a rear edge of one of the shelves 39, as shown, the lower of these shelves 39. The uppermost of the shelves 39 provides a work table on the top forward portion of the cart. As can best be seen in FIG. 1, the mid portion of the cart is an open compartment 41 extending fully from top to bottom of the cart. Each of the forward compartments 37 contains a drawer 43 which slides on the bottom 23 or one of the shelves 39 into the open compartment 41. As shown in FIGS. 7, 8 and 9, each drawer 43 has a handle 45 to facilitate withdrawal of the drawer 43 into the open compartment 41 and a pair of straps 47 to facilitate lifting and lowering of the drawer 43 out of and into the compartment 41.

Looking at FIGS. 2 and 5, the rear portions of the outer and inner side walls 11 and 13 extend below the bottom 23 of the cart to form legs 49 which, with the wheels 31 and 33, support the cart in its level standing condition.

Figure 10:
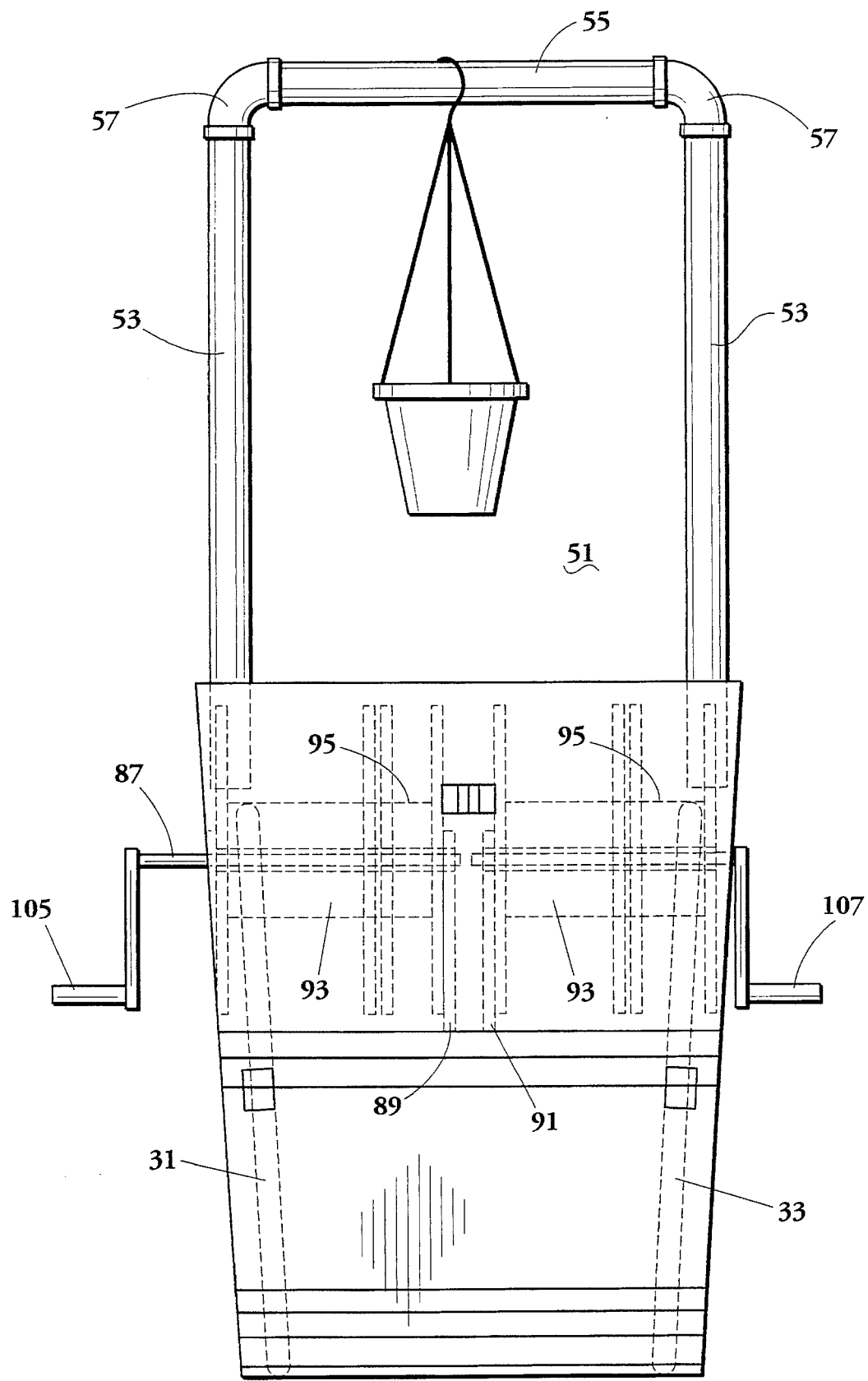
FIG. 10 is a rear elevation view of the cart of FIG. 1 illustrating the flower pot hanger mounted in its operating position.

Preferably, each leg 49 consists of the extension of the last two tool pots 27 on either side of the mid portion of the cart. These longer tool pots are also used to store flower pot hangers 51 which, as can best be seen in FIG. 10, consist of a pair of vertical tubular members 53 connected to the ends of a horizontal tubular member 55 by flexible elbow joints 57. The hangers 51 can be withdrawn from their storing tool pots 27 and inserted into transversely aligned tool pots of shorter length as illustrated in FIG. 10. The height of the horizontal tubular member 55 is thus determined by the depth of the tool pots 27 into which the vertical members 53 are inserted.

In the embodiment of the device shown in FIG. 5, an undercarriage drawer 59 is slidably mounted in a housing 61 extending forward of the legs 49 and beneath the cart bottom 23. The undercarriage drawer 59 has a handle 63 and slides laterally under the cart.

Returning to FIGS. 1 and 2, the rear portion of the cart consists of left 65 and right 67 substantially hexagonal arms or panels integrally extending from the upper portion of each of the outer sidewalls 11 and 15. A rod 69 extending transversely between the extensions 65 and 67 at the rearmost corner of each hexagon provides a push handle for the cart. Preferably, the horizontal top edges of the hexagonal extensions 65 and 67 are connected by a shelf 71 which serves as a rear table top work area for the cart. This table top is extendable by a leaf 73 connected to the shelf 71 by a hinge 75, the leaf 73 being supported in a horizontal position by a prop 77. With the prop 77 removed, the shelf 73 rotates to close the upper angled access plane 79 to the rear compartment. A lower angled panel 81, a lower horizontal panel 83 and a vertical panel 85 complete the closure of the rear portion of the cart. A pair of bearings 89 and 91 extend upwardly from the lower panel 83.

Figure 6:
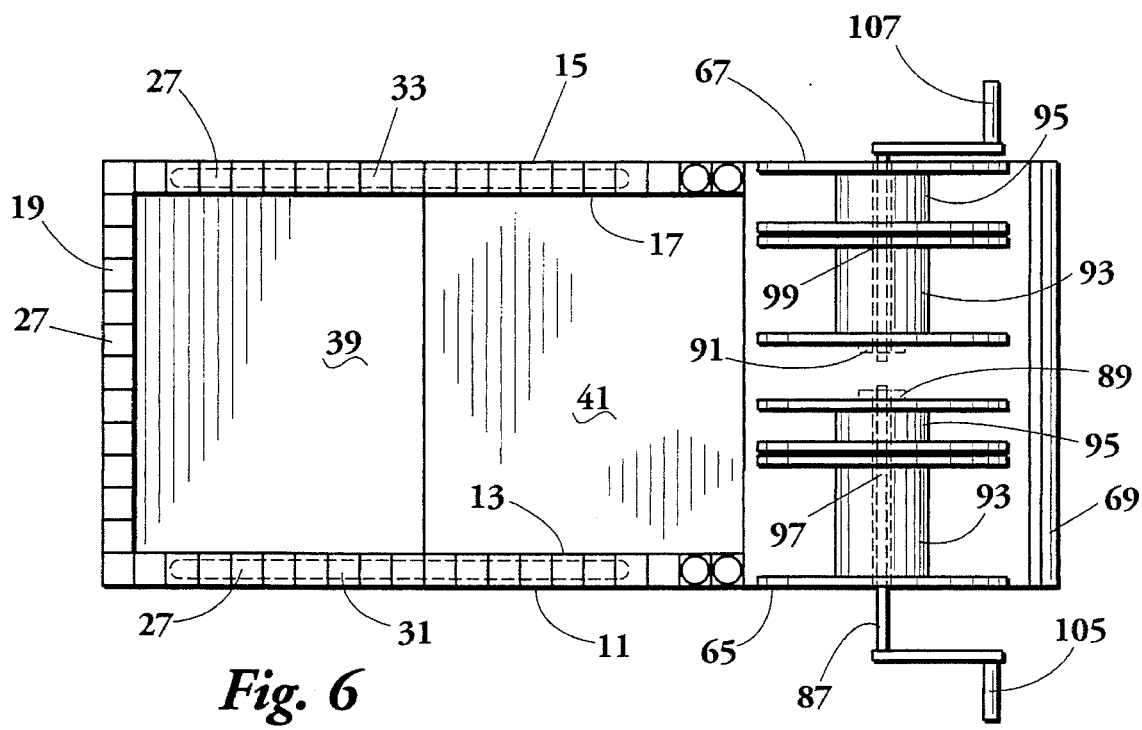
FIG. 6 is a cross-sectional view taken along the line 6—6 of FIG. 2.

Turning to FIGS. 6 and 10, the rear compartment contains a reel assembly including a pair of transverse tubular shafts 87 journalled for rotation between the left and right extensions 65 and 67 and the bearings 89 and 91 about an axis substantially centered on the hexagonal extensions 65 and 67. Mounted on the shafts 87 are left and right pairs of reels 93 and 95. As shown, the left reel 93 of each pair is of greater width than the right reel 95 of each pair. The shafts 87 are provided with pins 97 and 99 having ends which extend diametrically through their shaft 87 to form keys. The left pair of reels 93 and 95 are slotted in their abutting side portions to form a keyway for the left shaft pin 97 and the right pair of reels 93 and 96 are slotted at their abutting sides to form a keyway for the right shaft pin 99. Thus, when either shaft 87 is slid fully to the left in relation to the cart, its pin 97 or 99 engages the larger reel 93 to the shaft and when either shaft 87 is fully to its right position it is engaged to the smaller reel 95. The ends of the shaft 87 are provided with crank handles 105 and 107 to rotate the selected reels. The large reels 93 are used to store the main water and electrical power lines (not shown) which will extend from their source to the cart while the smaller reels 95 are used to store pigtail portions of hose and electrical power lines (not shown) which will be connected to the user's gardening equipment which will be used in the general vicinity of the cart.

Looking again at FIG. 2, the lower horizontal panel 83 and the vertical panel 85 at the rear of the cart, together with an extension of the plane of the lower angle panel 81, define a space extending transversely across the rear lower portion of the cart which is of right triangular cross-section. A frame or compartment 110 is provided which is configured to be stored in this space and attached at other positions on the cart. To this end, the frame 110 has opposed triangular ends 111 which are substantially congruent with this defined space. That is, the triangular ends 111 have perpendicular edges 84 and 86 of substantially the same length as the panels 83 and 85 and a hypothenuse 113 substantially equal to the length of the extended plane emanating from the panel 81. A panel 121 connects the hypothenuse edges 113 of the triangular ends 111. Prongs 115 and 117 extending outwardly from the panel 121 at right angles to the hypothenuse 113 are spaced so as to be insertable into the tops of equally spaced tool pots 27. A tubular ear 119 extends from the right angle corner of each triangular member end 111. The ears 119 are outwardly configured such that they may be inserted into the open upper end of any of the tool pots 27. The ears 119 are inwardly configured such that the vertical tubular members 53 can be inserted through the tubular ears 119. Thus, as can best be seen in FIG. 5, the compartment 110 can be stored by inserting the ears 119 into slots provided in the tool pots 27 defining the legs 49 so that the vertical members 53 can then be inserted into those tool pots 27 and through the ears 119 to lock the compartment 110 in its stored position in the lower rear portion of the cart. Alternatively, when the vertical members 53 are removed from their respective tool pots 27, the compartment 110 is released from the cart and can be mounted on top of the open compartment 41 by insertion of the prongs 115 and 117 into appropriate tool pots 27 or forward of the front outer wall 19 of the cart by insertion of the ears 119 into the forward most tool pots 27. The panel 121 provides a work table area over the open compartment 41 when mounted in the top of the cart or cooperates with the front wall 19 to define a receptacle when mounted in front of the cart. Handles 123 may be provided on each of the triangular ends 111 to facilitate manipulation of the compartment 110. In addition, a bungee type member 125 can be detachably extended between the lower rear edge of the cart and the handle 69 to further secure the compartment 110 in its stored condition at the lower rear portion of the cart.

It is preferred that the walls and panels of the cart will as much as possible be formed of transparent plastic so that the contents of the cart can be readily identified from any vantage point.

Thus, it is apparent that there has been provided, in accordance with the invention, a garden cart that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A cart for storing and transporting gardening tools and materials comprising a shell, a wheel assembly journalled to said shell for transporting said shell and a steering assembly fixed to a rear portion of said shell for guiding said shell during transport, said shell having a rectangular bottom and having front and side walls formed from pairs of flat parallel panels spaced apart and connected by flat vertical dividers extending continuously along a full depth between said pairs of panels to define arrays of tubular pots of approximately square cross-section, each for receiving a tool through an open upper end thereof.

2. A cart according to claim 1, said shell having a plurality of vertically stacked compartments defined by at least one shelf therebetween and an open compartment extending a full depth of said shell, said stacked compartments opening into said open compartment.

3. A cart according to claim 1, said wheel assembly comprising an axle aligned with an interior edge of one of said shelves and extending through opposite sides of said shell and a pair of wheels, one on each end of said axle and external to said shell.

4. A cart according to claim 3, said shell having arrays of said tubular pots of different lengths and extending from a top of said shell to a depth above said wheels, said pots having bottoms defining wells for said wheels.

5. A cart according to claim 3, said shell having at least one of said pots extending below a bottom thereof as a leg for, together with said wheels, supporting said shell in a substantially level condition.

6. A cart according to claim 1, said steering assembly comprising arms extending rearwardly from an upper portion of said shell and a rod extending between rearmost portions of said arms, a reel assembly mounted between said arms and a continuous conduit having one end extendible from said reel assembly for connection to a source and another end extendible from said reel assembly for connection to a tool.

7. A cart according to claim 6, said reel assembly having at least one pair of reels independently rotatable on a common shaft, one reel for storing and feeding said source end of said conduit and another reel for storing and feeding said tool end of said conduit.

8. A cart according to claim 1 further comprising a work table connected to a plurality of said pots and extending above said steering assembly.

9. A cart according to claim 1, said wheel assembly comprising an axle extending transversely across said shell at approximately a midpoint of said shell and through said side walls and a pair of wheels, one on each end of said axle and external to said shell, said wheels being large in relation to said shell but of diameter less than the length of said shell and disposed in wells defined by bottoms of said tool pots contoured substantially to an arc concentric with said wheels.

10. A cart according to claim 9, at least one of the rearmost of said pots of each of said side walls of shell extending below said bottom as legs for, together with said wheels, supporting said shell in a substantially level condition.

11. A cart according to claim 1, said steering assembly comprising arms extending rearwardly from an upper portion of said side walls, a rod extending between rearmost portions of said arms and a reel assembly mounted between said arms, said assembly having at least one pair of reels independently mounted on a common shaft and a continuous conduit having one end wound about one said reel for extension and retraction to and from a source and another end wound about another said reel for extension and retraction to and from a tool.

12. A cart for storing and transporting gardening tools and materials comprising a shell having a plurality of vertically stacked compartments defined by at least one shelf therebetween and an open compartment extending a full depth of said shell, a wheel assembly journalled to said shell for transporting said shell and a steering assembly fixed to a rear portion of said shell for guiding said shell during transport, said shell having a rectangular bottom and having front and side walls formed from pairs of flat parallel panels spaced apart and connected by flat vertical dividers to define arrays of tubular pots of approximately square cross-section, each for receiving a tool through an open upper end thereof.

13. A cart according to claim 12 further comprising a table top extending above said stacked compartments.

14. A cart for storing and transporting gardening tools and materials comprising a shell having a plurality of vertically stacked compartments defined by at least one shelf therebetween and an open compartment extending a full depth of said shell, an axle aligned with an interior edge of one of said shelves and extending through opposite sides of said shell, a pair of wheels on the ends of said axle external to said shell for transporting said shell and a steering assembly fixed to a rear portion of said shell for guiding said shell during transport, said shell having a rectangular bottom and having front and side walls formed from pairs of flat parallel panels spaced apart and connected by flat vertical dividers to define arrays of tubular pots of approximately square cross-section, each for receiving a tool through an open upper end thereof, at least one pair of said pots extending below a bottom and on opposite sides thereof as legs for, together with said wheels, supporting said shell in a substantially level condition.

15. A cart according to claim 14 further comprising a pair of vertical members connected at upper ends thereof to opposite ends of a horizontal member, said vertical members being slidably insertable into said opposite pots extending to said legs and into opposite pots above said wheels for storage and for providing a hanger, respectively.

16. A cart for storing and transporting gardening tools and materials comprising a shell, a wheel assembly journalled to said shell for transporting said shell, a steering assembly fixed to a rear portion of said shell for guiding said shell during transport, said shell having a rectangular bottom and having front and side walls formed from pairs of panels spaced by vertical dividers to define arrays of tubular pots, each for receiving a tool through an open upper end thereof, and a frame having opposing right triangular sides fixed to a panel along the hypotenuse edges thereof, said panel having a plurality of prongs depending therefrom and positioned for alignment with and insertion into the open upper ends of a plurality of said pots for securing said panel as a work table atop said shell and a pair of ears extending from the right angle corners of said triangles for insertion into the open upper ends of a pair of said pots of said front wall whereby said panel and said front wall cooperate to form a storage compartment forward of said front wall.

17. A cart according to claim 14, said triangles having right angle legs thereof dimensioned to fit in a space defined by the rear edges of said shell side walls and the lower edges of said arms, said ears being tubular and said rearmost of said pots having slots therein for receiving said ears in alignment with said pots, said cart further comprising a pair of vertical members connected at upper ends thereof to opposite ends of a horizontal member, said vertical members being slidably insertable into said rearmost pots and through said ears to secure said frame in said space and into opposite pots above said wheels for providing a hanger above said shell.

18. A cart according to claim 17, said shell having a plurality of vertically stacked compartments defined by at least one shelf therebetween and an open compartment extending a full depth of said shell, said axle being aligned with an interior edge of one of said shelves, at least one of said stacked compartments containing a drawer horizontally slidable into and vertically liftable out of said open compartment.

* * * * *